United States Patent
Gadkaree et al.

(10) Patent No.: US 9,672,992 B2
(45) Date of Patent: *Jun. 6, 2017

(54) COKE SOURCED ANODE FOR LITHIUM ION CAPACITOR

(71) Applicant: CORNING INCORPORATED, Corning, NY (US)

(72) Inventors: Kishor Purushottam Gadkaree, Painted Post, NY (US); Rahul Suryakant Kadam, Corning, NY (US)

(73) Assignee: Corning Incorporated, Corning, NY (US)

(\*) Notice: Subject to any disclaimer, the term of this patent is extended or adjusted under 35 U.S.C. 154(b) by 131 days.

This patent is subject to a terminal disclaimer.

(21) Appl. No.: 14/610,752

(22) Filed: Jan. 30, 2015

(65) Prior Publication Data

US 2016/0225539 A1    Aug. 4, 2016

(51) Int. Cl.
*H01G 11/38* (2013.01)
*H01G 11/06* (2013.01)
*H01G 11/24* (2013.01)
*H01G 11/42* (2013.01)
*H01G 11/44* (2013.01)
(Continued)

(52) U.S. Cl.
CPC ........... *H01G 11/38* (2013.01); *H01G 11/06* (2013.01); *H01G 11/24* (2013.01); *H01G 11/42* (2013.01); *H01G 11/44* (2013.01); *H01G 11/50* (2013.01); *H01G 11/86* (2013.01); *H01G 11/34* (2013.01); *Y02E 60/13* (2013.01)

(58) Field of Classification Search
CPC ........ H01G 11/38; H01G 11/86; H01G 11/50; H01G 11/24; H01G 11/06; H01G 11/42; H01G 11/44

See application file for complete search history.

(56) References Cited

U.S. PATENT DOCUMENTS 7,283,349 B2   10/2007   Yoshida et al.
7,582,902 B2    9/2009   Tano et al.
(Continued)

FOREIGN PATENT DOCUMENTS

CN    10126539 A     9/2008
EP    0767505 A1     4/1997
(Continued)

OTHER PUBLICATIONS

Kostecki et al., Raman Spectroscopy and Electron Microscopy of heat-treated Petroleum Cokes for Lithium-intercalation Electrodes, 1997, J. Electrochem. Soc., vol. 144, No. 9, pp. 3111-3117.*

(Continued)

*Primary Examiner* — David M Sinclair
(74) *Attorney, Agent, or Firm* — John L. Haack

(57) ABSTRACT

An anode in a lithium ion capacitor, including: a carbon composition comprising: a coke sourced carbon, a conductive carbon, and a binder as defined herein; and an electrically conductive substrate supporting the carbon composition, wherein the coke sourced carbon has a disorder by Raman analysis as defined herein; and a hydrogen content; a nitrogen content; an and oxygen content as defined herein. Also disclosed is a method of making the anode, a method of making the lithium ion capacitor, and methods of use thereof.

9 Claims, 4 Drawing Sheets

(51) Int. Cl.
*H01G 11/50* (2013.01)
*H01G 11/86* (2013.01)
*H01G 11/34* (2013.01)

(56) References Cited

U.S. PATENT DOCUMENTS

| | | | |
|---|---|---|---|
| 7,625,839 B2 | 12/2009 | Hirahara et al. | |
| 7,964,173 B2 | 6/2011 | Oyama et al. | |
| 8,142,930 B2 | 3/2012 | Kojima et al. | |
| 8,318,356 B2 | 11/2012 | Gadkaree et al. | |
| 8,524,632 B2 | 9/2013 | Gadkaree et al. | |
| 8,541,338 B2 | 9/2013 | Gadkaree et al. | |
| 8,652,995 B2 | 2/2014 | Gadkaree et al. | |
| 8,784,764 B2 | 7/2014 | Gadkaree et al. | |
| 9,070,933 B2* | 6/2015 | Ikeda | H01M 4/0471 |
| 9,108,852 B1 | 8/2015 | Gadkaree et al. | |
| 2008/0165471 A1 | 7/2008 | Kojima et al. | |
| 2008/0204972 A1* | 8/2008 | Yoshida | H01G 9/035 |
| | | | 361/502 |
| 2009/0135549 A1* | 5/2009 | Ando | H01G 11/26 |
| | | | 361/503 |
| 2009/0214949 A1 | 8/2009 | Ugawa | |
| 2010/0296226 A1* | 11/2010 | Nanba | B82Y 30/00 |
| | | | 361/502 |
| 2011/0002086 A1* | 1/2011 | Feaver | C01B 31/00 |
| | | | 361/502 |
| 2011/0182000 A1 | 7/2011 | Gadkaree et al. | |
| 2011/0261501 A1 | 10/2011 | Gadkaree et al. | |
| 2012/0003534 A1* | 1/2012 | Sheem | H01M 4/131 |
| | | | 429/218.1 |
| 2012/0134075 A1 | 5/2012 | Kawai | |
| 2013/0148265 A1 | 6/2013 | Okuno et al. | |
| 2013/0155577 A1* | 6/2013 | Yang | H01M 4/133 |
| | | | 361/502 |
| 2013/0171502 A1* | 7/2013 | Chen | H01G 11/06 |
| | | | 429/149 |
| 2013/0194721 A1 | 8/2013 | Cho et al. | |
| 2013/0201606 A1 | 8/2013 | Nansaka et al. | |
| 2013/0202945 A1 | 8/2013 | Zhamu et al. | |
| 2013/0208404 A1* | 8/2013 | Yasuda | H01G 11/06 |
| | | | 361/516 |
| 2013/0209348 A1 | 8/2013 | Ludvik et al. | |
| 2014/0079994 A1 | 3/2014 | Affinito et al. | |
| 2014/0101992 A1 | 4/2014 | Mennell et al. | |
| 2014/0134438 A1 | 5/2014 | Gadkaree et al. | |
| 2014/0146440 A1 | 5/2014 | Gadkaree et al. | |
| 2014/0177136 A1 | 6/2014 | Kim et al. | |
| 2014/0293507 A1 | 10/2014 | Gadkaree et al. | |
| 2016/0087263 A1 | 3/2016 | Gadkaree et al. | |
| 2016/0133394 A1 | 5/2016 | Sakshaug et al. | |

FOREIGN PATENT DOCUMENTS

| | | | |
|---|---|---|---|
| EP | 2958122 | | 12/2015 |
| JP | 2004266239 A | | 9/2004 |
| JP | 2005302300 | | 10/2005 |
| JP | 2006004997 A | * | 1/2006 |
| JP | 2006086148 A | | 3/2006 |
| JP | 2008289820 A | | 12/2008 |
| JP | 2010118216 A | | 5/2010 |

OTHER PUBLICATIONS

International Search Report and Written Opinion PCT/US2013/015244 Dated Jun. 2, 2016.
International Search Report and Written Opinion PCT/US2016/015033 Dated May 10, 2016.
International Search Report and Written Opinion PCT/US2016/015041 Dated Jun. 13, 2016.
International Search Report and Written Opinion PCT/US2016/015245 Dated May 12, 2016.
Shu et al. J. Electrochem. Soc., vol. 140, No. 4, 922-927, Apr. 1993.
International Search Report and Written Opinion PCT/US2016/015273 Dated Apr. 15, 2016.
International Search Report and Written Opinion PCT/US2015/061796 Dated Apr. 13, 2016.
Lastoskie et al. "Pore Size Distribution Analysis of Microporous Carbons: A Density Function Theory Approach", J. Phys. Chem. 1993, 97, 4786-4796.
Chang et al., The Influence of Different Electrode Fabrication Methods and Poly(Vinylidene Fluoride) Binders on the Anode Electrode Dimension Stability and Cyclability in Lithium-Ion Batteries, Journal of New Materials for Electrochemical Systems 11, 43-47 (2008).
Liu et al., Particles and Polymer Binder Interaction: A Controlling Factor in Lithium-Ion Electrode Performance, Journal of the Electrochemical Society, 159(3), A214-A221 (2012).
You et al., Interaction of Poly(vinylidene fluoride) with Graphite Particles. 1. Surface Morphology of a Composite Film and Its Relation to Prtocessing Parameters, Chem. Mater., 15, 850-861 (2003).
Yoo et al., Interaction of Poly(vinylidene fluoride) with Graphite Particles. 2. Effect of Solvent Evaporation Kinetics and Chemical Properties of PVDF on the Surface Morphology of a Composite Film and Its Relation to Electrochemical Performance, Chem. Mater., 16, 1945-1953 (2004).

* cited by examiner

COKE SOURCED ANODE FOR LITHIUM ION CAPACITOR

CROSS-REFERENCE TO RELATED APPLICATIONS

The present application is related commonly owned and assigned USSN Application Nos., filed concurrently herewith:
Ser. No. 14/610,782, entitled "ANODE FOR LITHIUM ION CAPACITOR";
Ser. No. 14/610,848, entitled "PHENOLIC RESIN SOURCED CARBON ANODE IN A LITHIUM ION CAPACITOR";
Ser. No. 14/610,811, entitled "POLY-VINYLIDENE DIFLUORIDE ANODE IN A LITHIUM ION CAPACITOR"; and
Ser. No. 14/610,868, entitled "CATHODE FOR LITHIUM ION CAPACITOR," but does not claim priority thereto.

The entire disclosure of each publication or patent document mentioned herein is incorporated by reference.

BACKGROUND

The disclosure relates to a lithium ion capacitor (LIC), to an anode in the LIC, and to a carbon composition in the anode.

SUMMARY

In embodiments, the disclosure provides an coke sourced carbon composition for an anode in a lithium ion capacitor.

In embodiments, the disclosure provides an anode for a lithium ion capacitor having a low surface area carbon obtained from a coke source.

BRIEF DESCRIPTION OF THE DRAWINGS

In embodiments of the disclosure.

DETAILED DESCRIPTION

Figure 1:
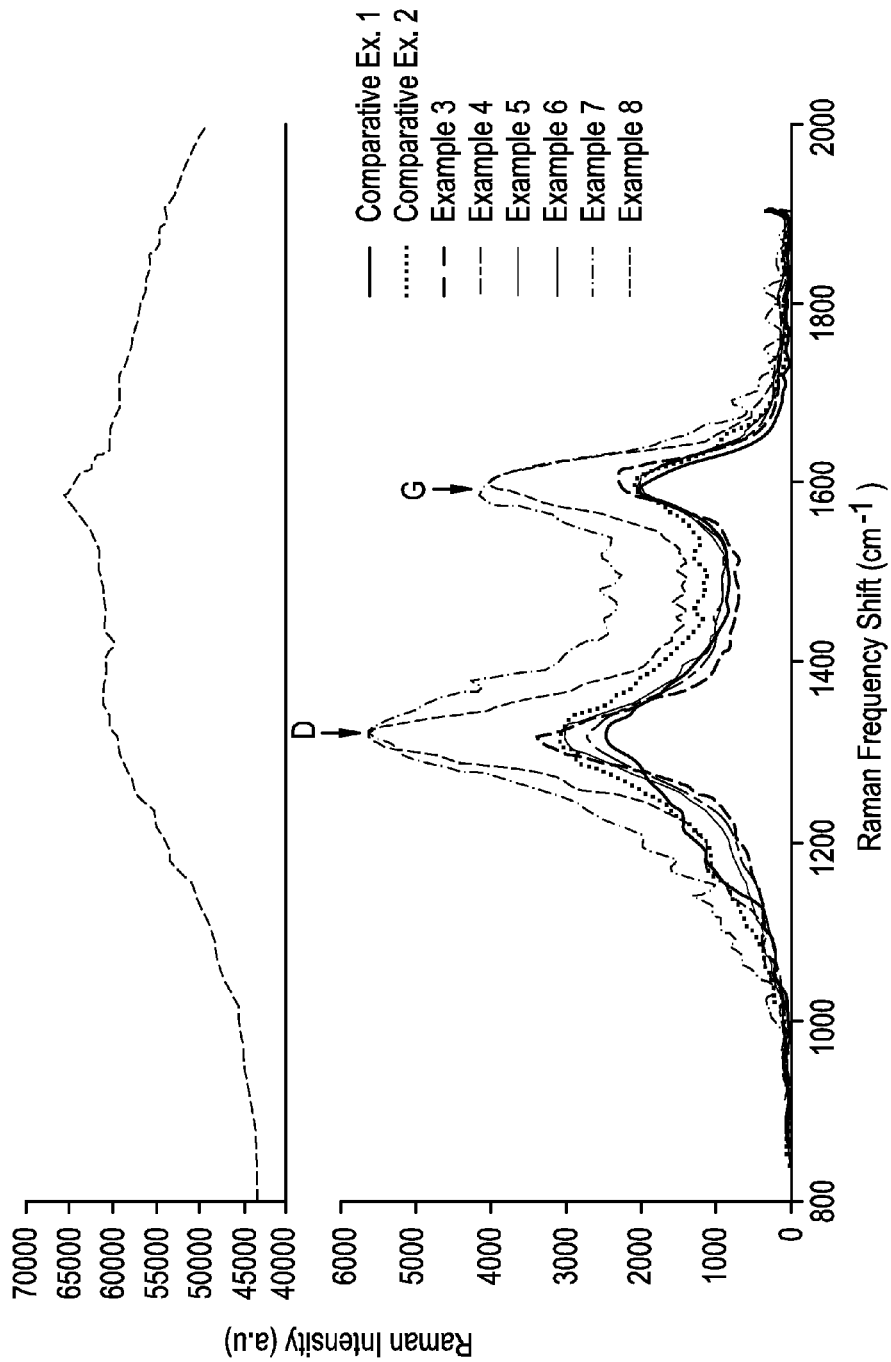
FIG. 1 shows a comparison of Raman spectroscopy frequency shifts and intensities of different carbons.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Features or aspects recited in any of the claims are generally applicable to all facets of the invention. Any recited single or multiple feature or aspect in any one claim can be combined or permuted with any other recited feature or aspect in any other claim or claims.

DEFINITIONS

"Raman structural analysis," "Raman analysis," or like terms refer to and rely on the disorder (D) peak, the graphitic (G) peak, and a consideration of the peak intensity ratio $I_D/I_G$. The D peak intensity ($I_D$) relates to the extent of disorder in the carbon whereas the G peak intensity ($I_G$) relates to the extent of highly oriented graphitic planes. The peak intensity ratio of $I_D/I_G$ gives a quantification of the carbon structure. The higher the peak ratio of $I_D/I_G$ the greater the disorder in the carbon.

"Anode," "anode electrode," "negative electrode," or like terms refers to an electrode through which positive electric charge flows into a polarized electrical device and electrons flow out of the electrode to an outside circuit.

"Cathode," "cathode electrode," "positive electrode," or like terms refers to an electrode from which positive electric charge flows out of a polarized electrical device.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Lithium ion capacitors (LICs) are a new class of innovative hybrid energy storage devices. Unlike EDLC's, which store energy based on double layer mechanism on both electrodes, the hybrid lithium ion capacitors store energy on the cathode via the double layer mechanism whereas energy storage on the anode is via Faradaic mechanism. As a result, the energy density in such devices can be, for example, five times greater than an EDLC, while maintaining the power also at a 3 to 4 times greater than an EDLC's power. Despite the Faradaic mechanism of energy storage, these LIC devices still show very high cycle life, for example, in excess of 200,000 cycles, making the devices attractive for many applications. LICs utilize a high surface area (typically greater than 1,000 m$^2$/g) carbon on the positive electrode and an intercalating carbon with low porosity and low surface area (typically less than 300 m$^2$/g) on the anode, which combination of a high and a low surface area carbon supports fast intercalation and de-intercalation of lithium ions. During charge and discharge, lithium intercalation and de-intercalation occurs within the bulk of the negative electrode (i.e., the anode), whereas anion adsorption and desorption takes place on the positive electrode (i.e., the cathode). The adsorption and desorption on the positive electrode is a non-Faradaic reaction, which is relatively faster than the lithium ion intercalation and de-intercalation on the negative electrode.

In the lithium ion capacitor, the negative electrode (intercalating and de-intercalating) can be pre-doped with lithium metal. The pre-doping of the lithium ion capacitor allows an increase in the voltage to approximately about 3.8 volts.

A lithium ion capacitor permits a voltage of about 1.5 times greater than that of an EDLC. The cell capacitance (C=Q/V) can be stated by the charge-discharge curve. Since the energy density and power are both proportional to square of the voltage there is a significant increase in energy and power density of the device. In addition to the voltage related increase, the Faradaic reaction also has significantly greater energy associated with it and contributes to an increase in the energy and the power density. The negative electrode stays at a constant or even potential during the charging and discharging of the cell.

Properties of the anode are significant to the performance of the device. These properties are derived mainly from the materials comprising the anode, such as the carbon material. The properties required for the Li ion capacitor anode are different from properties required for Li ion battery anodes, although both involve insertion of lithium ions in the carbon structure. The Li ion capacitor is a power device and fast intercalation-deintercalation of ions is essential, whereas for Li ion batteries a slow intercalation rate is acceptable. In embodiment, the disclosure provides a carbon for the use in an anode electrode of a lithium ion capacitor. The data provided was obtained at desired high charge-discharge rates.

In a lithium ion battery the cathode electrochemical processes are rate controlling whereas in a lithium ion capacitor the anode electrochemical processes are rate controlling. The anode side essentially controls the significant properties such as charge and discharge capacities, which directly affects the energy and power performance of a lithium ion capacitor. These properties are derived mainly from the materials comprising the anode. The carbon materials comprising the anode are significant to the performance of the device.

Different types of carbons have been evaluated as anode materials in lithium ion capacitors. Graphite has been a material of choice, but hard carbon materials, i.e., non-graphitic materials having low surface area are also being evaluated. Hard carbon materials show higher discharge capacities than graphite due to structural differences.

In embodiments, the disclosure provides an anode in a lithium ion capacitor, comprising:
a carbon composition comprising: a coke sourced carbon in from 85 to 95 wt %; a conductive carbon in from 1 to 8 wt %; and a binder in from 3 to 10 wt %, based on the total weight of the carbon composition; and
an electrically conductive substrate that supports the carbon composition, for example, a copper or aluminum foil or sheet, wherein the coke sourced carbon has a disorder (D) peak to graphitic (G) peak intensity ratio by Raman analysis of from 1.25 to 1.55; a hydrogen content of from 0.01 to 0.25 wt %; a nitrogen content of from 0.03 to 0.75 wt %; and an oxygen content of from 0.05 to 2.0 wt % by elemental analysis.

In embodiments, the coke sourced carbon can be present, for example, in from 88 to 92 wt %; the conductive carbon can be present, for example, in from 4 to 7 wt %; and the binder can be, for example, PVDF and can be present, for example, in from 4 to 6 wt % and has a molecular weight of from 300,000 to 1,000,000.

In embodiments, the coke sourced carbon can have, for example, a disorder (D) peak to graphitic (G) peak intensity ratio by Raman analysis of from 1.35 to 1.48.

In embodiments, the coke sourced carbon can be have, for example, a hydrogen content of from 0.01 to 0.24 wt %; a nitrogen content of from 0.08 to 0.7 wt %; and an oxygen content of from 0.01 to 1.9 wt % by elemental analysis.

In embodiments, the coke sourced carbon has a low surface area of from 1 to 100 m$^2$/g.

In embodiments, the coke sourced carbon can have, for example, a particle size from 1 to 30 microns, 2 to 10 microns, from 2 to 7 microns, and like particle sizes, including intermediate values and ranges.

In embodiments, the anode can further comprise, for example, a lithium composite powder coated on at least a portion of the surface of the anode.

In embodiments, the disclosure provides a lithium ion capacitor, comprising:
the abovementioned anode comprising a carbon composition comprising: a coke sourced carbon in from 85 to 95 wt %; a conductive carbon in from 1 to 8 wt %; and a binder in from 3 to 10 wt %, based on the total weight of the carbon composition; and
an electrically conductive substrate that supports the carbon composition, for example, a copper or aluminum foil or sheet, wherein the coke sourced carbon has a disorder (D) peak to graphitic (G) peak intensity ratio by Raman analysis of from 1.25 to 1.55; a hydrogen content of from 0.01 to 0.25 wt %; a nitrogen content of from 0.03 to 0.75 wt %; and an oxygen content of from 0.05 to 2.0 wt % by elemental analysis.

In embodiments, the anode can operate at, for example, a high charge-discharge rate of from 1 C to 4000 C.

In embodiments, the lithium ion capacitor can further comprise, for example, a cell comprising a stack of: the anode; a cathode comprising a heat and KOH activated wheat flour sourced carbon, for example, 85% Corning carbon), a fluoropolymer, for example, 10% PTFE DuPont 601A Teflon, and a conductive carbon black, for example, 5% Cabot Black Pearl 2000; a separator, for example, an NKK-4425; and at least a portion of the surface of the anode having a coating of the lithium composite powder.

In embodiments, the cell can have, for example, a discharge capacity of from 60 to 120 mAh/gm, for example, 67.09 mAh/gm based on the anode carbon weight, and a maximum energy density of from 30 to 60 Wh/l, for example, 49.62 Wh/l.

In embodiments, the disclosure provides a method of making a carbon electrode comprising:
grinding a coke sourced carbon to particles of from 1 to 30 microns;
mixing the coke particles with a binder, and a solvent to form a mixture; and applying the mixture on a conductive current collector such as copper or aluminum foil, or like foils, having a thickness of 10 to 500 microns, to form the electrode.

In embodiments, the method of making can further comprise heat treating the coke particles at from 1000° C. to 1700° C. in an inert atmosphere prior to applying the mixture on the conductive current collector.

In embodiments, the method of making can further comprise treating the coke particles with an acid prior to the heat treatment.

In embodiments, the method of making can further comprise including a conductive carbon in an amount of from 2 to 10 wt % in the mixture.

The present disclosure is advantaged in several aspects, including for example:

The coke based or sourced carbon demonstrated superior rate performance, especially at higher currents, over the comparative phenolic resin based carbon and the graphite based carbon.

The coke sourced or coke based carbon demonstrated superiority in energy and power density performance over the comparative phenolic resin based carbon and the graphite based carbon. The coke sourced carbon or coke based carbon is expected to be significantly lower in cost than other carbon sources.

In embodiments, a coke sourced carbon has been identified, which coke shows high discharge capacities compared to other hard carbons and graphite. Additionally, the coke has superior rate performance especially at high rates leading to higher power and better performance. The coke carbon material, methods of making and using, and device performance results are provided and compared with alternative prior art carbon material materials.

In embodiments, the disclosure provides a coke based low surface area carbon as an anode material in a lithium ion capacitor. The coke based carbon was acquired commercially, for example, from ConocoPhillips, and shows higher discharge capacity compared to graphite and phenolic resin based carbon. Charge and Discharge Capacity is a quantitative measure of charge being stored and discharge respectively during the charge-discharge process. Discharge capacity is an intrinsic property of a carbon material. The higher the discharge capacity, the higher the energy density of the device. The discharge capacity of a carbon material depends on the structure of the carbon and the impurity levels present in the carbon material. Additionally, data is also presented on the rate performance of coke based carbon compared to graphite (standard material used in literature studies) and to a phenolic resin (660° C.) (comparative prior art commercial material). The coke based carbon shows superior rate performance especially at higher rates (higher currents). Rate performance is significant in a capacitor device since the device is subjected to high rate charge-discharge cycles, and unlike batteries where the charge discharge rates are orders of magnitude lower.

The fundamental function and operation of a lithium ion capacitor is different than a lithium ion battery. In a lithium ion battery, the anode comprises of lithium intercalating carbon such as graphite, mesocarbon microbeads (MCMB), hard carbon or soft carbon and the cathode comprises of materials made from lithium complexed with transition metals. Some prominent cathode material used in the lithium ion battery industry are, for example, $LiCoO_2$ (lithium cobalt oxide), $LiMn_5Ni_{0.5}O_4$ (lithium manganese nickel oxide), and $LiMn_2O_4$ (lithium manganese oxide), and $LiFePO_4$ (lithium iron phosphate).

A carbonaceous material when used on the anode electrode in a lithium ion capacitor can intercalate and de-intercalate lithium ions. Charge and discharge capacity is a quantitative measure of the carbon materials ability to store or discharge charge. Discharge capacity is an intrinsic property of a carbon material. The discharge capacity of the carbon material depends on the structure of the carbon and the impurity levels present in the carbon material. The discharge capacities can directly reflect on the significant performance aspects of a cell. A higher discharge capacity is a desirable property in a carbon on the anode side as it will directly beneficially affect the packaging volume of a cell, which in turn will beneficially affect the energy and power density in a lithium ion capacitor device. Notably, the capacity must be measured at high rates since a capacitor is a power device, unlike an energy device such as a battery, where the rates are significantly lower. The capacity of a material at high rates will be different than at low rates, and will be a function of material structure which controls the diffusion rate of lithium ion into the structure of the material.

Figure 2:
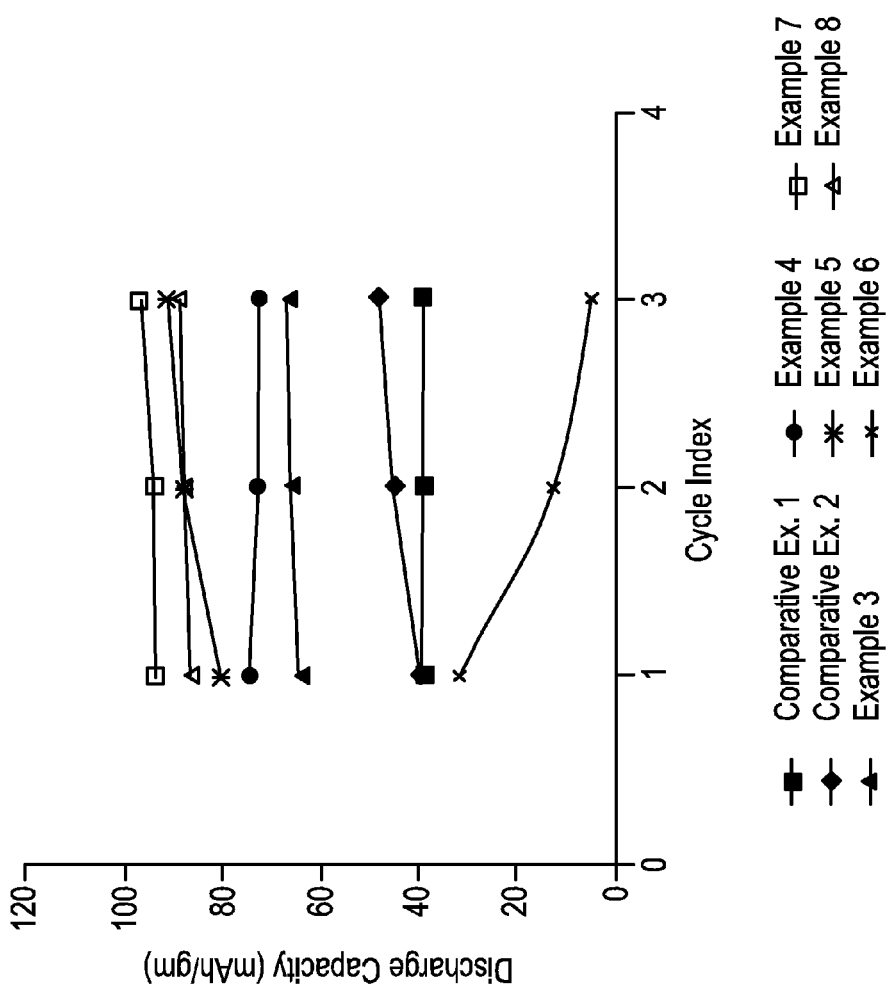
FIG. 2 shows discharge capacities for conditioning cycles for carbon based on different raw materials.
Figure 4:
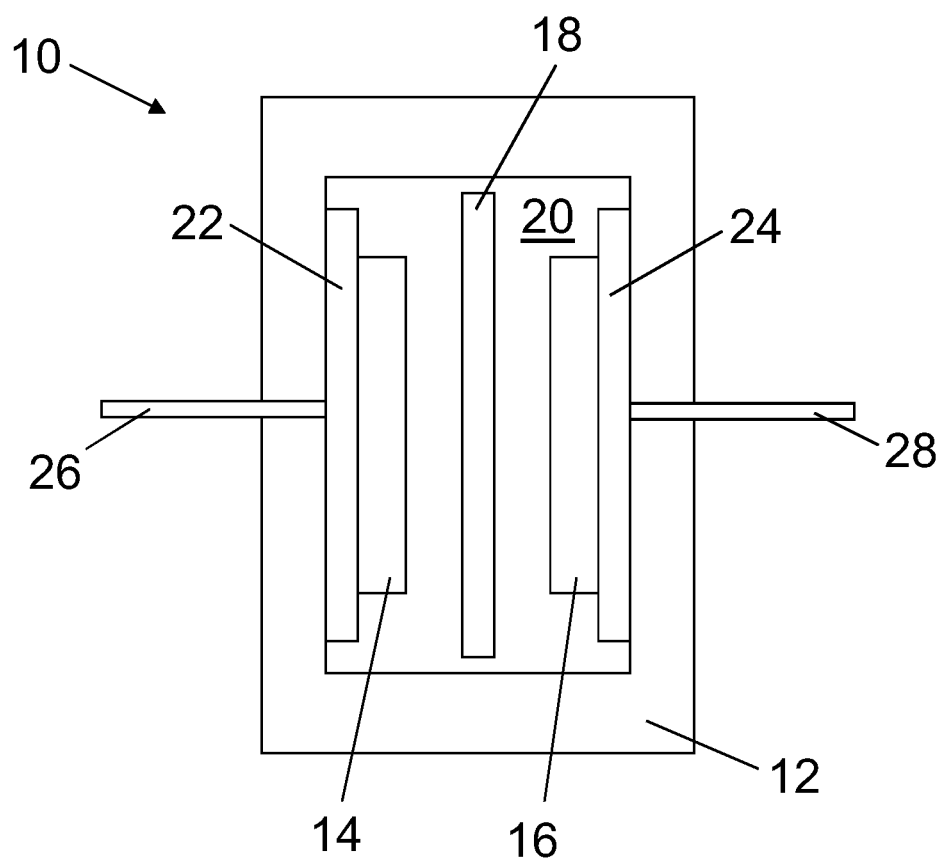
FIG. 4 is a schematic illustration of an example lithium ion capacitor.

In embodiments, the disclosure provides a coke based carbon that when used in an anode of a LIC battery has high discharge capacities and superior rate performance. FIG. 2 shows the discharge capacities (normalized on the anode carbon weight, measured at C/2 rate) during the conditioning cycles for coke based carbon, phenolic resin carbon (resin carbonized at 660° C.), and graphite. It is apparent that the discharge capacity (FIG. 2) for the coke based carbon is higher than both phenolic resin carbon (carbonized at 660° C.) and graphite. FIG. 4 is a schematic illustration of an example lithium ion capacitor. Lithium ion capacitor 10 includes an enclosing body 12, a pair of current collectors 22, 24, a first carbon mat 14 and a second carbon mat 16 each respectively disposed adjacent to one of the current collectors, and a porous separator layer 18. Electrical leads 26, 28 can be connected to respective current collectors 22, 24 to provide electrical contact to an external device. Among layers 14 and 16 one comprises activated carbon, carbon black, and binder, and another comprises a coke sourced carbon as described herein, carbon black, and binder. A liquid electrolyte 20 is contained within the enclosing body and incorporated throughout the porosity of both the porous separator layer and each of the porous electrodes. In embodiments, individual lithium ion capacitor cells can be stacked (e.g., in series) to increase the overall operating voltage. The enclosing body 12 can be any known enclosure means commonly-used with lithium ion capacitor. The current collectors 22, 24 generally comprise an electrically-conductive material such as a metal, and commonly are made of aluminum or copper due to the electrical conductivity and relative cost. For example, current collectors 22, 24 may be thin sheets of aluminum foil or copper foil. Porous separator 18 electronically insulates the electrodes from each other while allowing ion diffusion.

The untreated High Density Coke (NPC-15) had a discharge capacity of 67.09 mAh/gm, the High Density Coke (NPC-15) treated at 1400° C. had a discharge capacity of 73.164 mAh/gm, and the High Density Coke (NPC-15) treated at 1600° C. had a discharge capacity of 91.62 mAh/gm.

Figure 3:
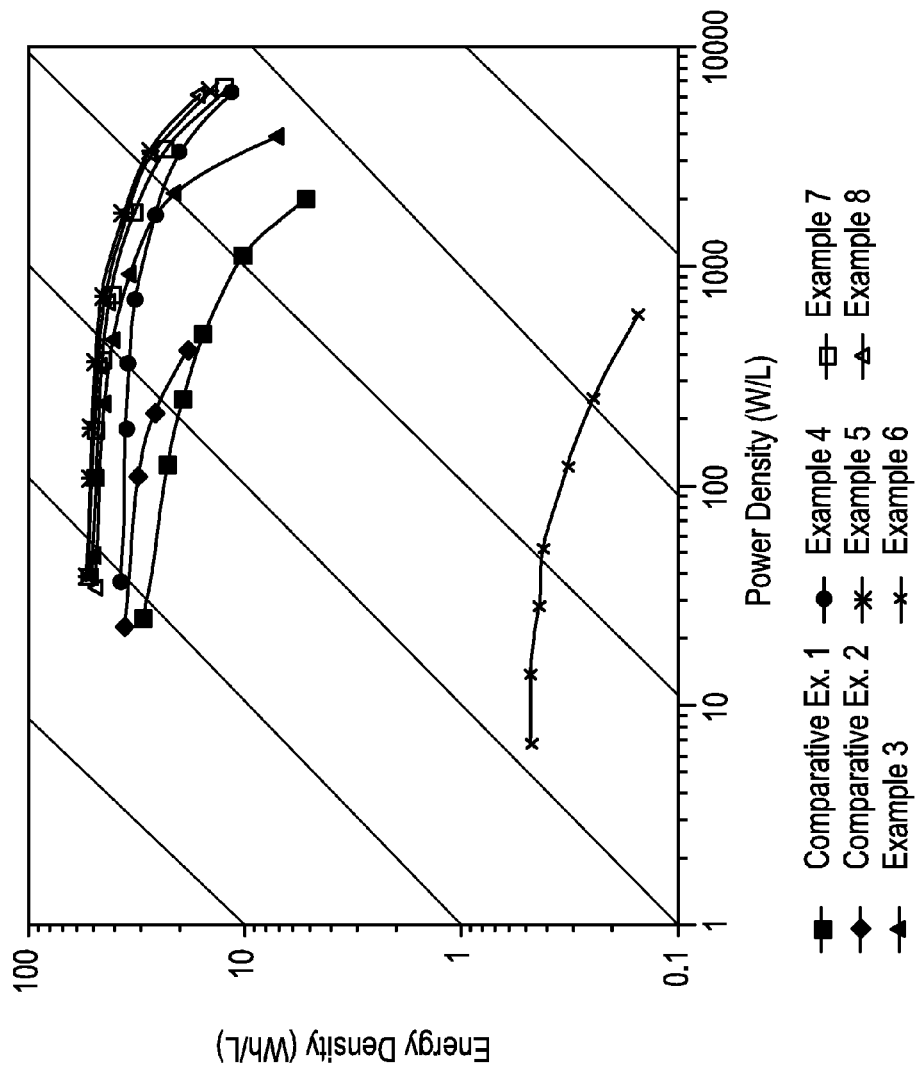
FIG. 3 shows a Volumetric Ragone plot comparing the rate performances of carbons from different raw materials.

The Conoco Rodeo Green Coke—untreated had a discharge capacity of 5.330 mAh/gm; treated at 1400° C. had a discharge capacity of 96.84 mAh/gm; and treated at 1600° C. had a discharge capacity of 89.22 mAh/gm; compared to the phenolic resin carbonized at 660° C. (39.37 mAh/gm) and the graphite (48.46 mAh/gm) after three conditioning charge-discharge cycles. This desirable trait of the coke sourced carbons, especially the carbons that were heat treated at 1400° C. or 1600° C., provides a beneficial effect in the energy density and power density (rate performance) for a lithium ion capacitor made with the coke based carbon. FIG. 3 shows the rate performance comparison for eight different carbon sources, i.e., two carbons produced or sourced from a phenolic resin or a graphite, and six coke sourced carbons. The coke sourced carbons heated to 1400° C. and 1600° C. exhibited superior rate performance at higher C-rates. The coke based carbons overall showed higher energy densities and power densities compared to other two comparative carbons at low, medium, and high rates. Superior high rate performance is significant in a capacitor device because the device is subjected to high rate charge-discharge cycles unlike batteries where the charge discharge rates are orders of magnitude lower.

The high density coke (NPC-15)-untreated had an energy density of 49.62 Wh/l and a power density of 46.96 W/l at approximately 1 C rate. The high density coke (NPC-15)-treated at 1400° C. had an energy density of 34.483 Wh/l and a power density of 36.197 W/l at approximately 1 C rate. The high density coke (NPC-15)-treated at 1600° C. had an energy density of 53.702 Wh/l and a power density of 36.305 W/l at approximately 1 C rate. The Conoco Rodeo Green Coke—untreated had an energy density of 0.477 Wh/l and a power density of 6.675 W/l at approximately 1 C rate. The Conoco Rodeo Green Coke—treated at 1400° C. had an energy density of 52.059 Wh/l and a power density of 37.063 W/l at approximately 1 C rate. The Conoco Rodeo Green Coke—treated at 1600° C. had an energy density of 48.897 Wh/l and a power density of 34.416 W/l at approximately 1 C rate. The phenolic resin (carbonized at 660° C.) had an energy density of 29.44 Wh/l and power density of 24.88 W/l at approximately a 1 C rate, and the graphite had an energy density of 36.67 Wh/l and power density of 26.27 W/l at approximately a 1 C rate. The coke sourced carbons heated at 1400° C. and 1600° C. demonstrated superiority and an advantage in energy and power density performance over the phenolic resin and the graphite based carbon.

In embodiments, the disclosure provides a coke based or coke sourced carbon as an anode material in a lithium ion capacitor. The disclosure includes the performance comparison of anodes containing coke based carbon with carbons produced from different raw materials such as phenolic resin and graphite. The disclosure addresses aspects of the performance of the lithium ion capacitor having the coke sourced carbon as an electrode material on the anode side, and compares the lithium ion capacitor's performance with other carbons made from phenolic resin and graphite.

EXAMPLES

The following Examples demonstrate making, use, and analysis of the disclosed coke sourced carbon, a LIC anode including the coke, an LIC including the anode, and methods in accordance with the above general procedures and specific examples below.

Comparative Example 1

Phenolic Resin Sourced Carbon Cabonized at 660° C. (Mentioned in US 2013/0201606A1)

A phenolic resin, GP® 510D50 REST-SET® phenolic impregnating resin (from Georgia Pacific) was cured at from 100 to 125° C. A phenolic resin plate was also prepared by curing the phenolic resin at 100 to 120° C. and then ground to a fine powder. The powdered resin was then placed in a retort furnace and heated at 50° C./hr to 500° C. The furnace temperature was then held at 500° C. for 1 hr. The furnace was then ramped at 10° C./hr to 660° C. The furnace was then held at 660° C. for 1 hr. The furnace was switched off and passively cooled. The resulting carbon was ground to a 5 micron particle size and subjected to Raman spectroscopy for structure analysis. The stacked Raman spectra are shown in FIG. 1. The phenolic resin sourced carbon treated at 660° C. had an $I_D$ peak (disorder peak) at 1308.83 $cm^{-1}$ with an intensity of 2339.745 a.u., and an $I_G$ peak at about 1601.01 $cm^{-1}$ with an intensity of 1952.962 a.u. (Table 1). The peak ratio of $I_D/I_G$ for phenolic resin sourced carbon treated at 660° C. was 1.20. The phenolic resin sourced carbon was also subjected to relative percentage elemental analysis. The samples were dried under vacuum at 125° C. for 6 hrs prior to the analysis. All the elemental results are reported on a dried basis and are summarized in Table 2. The phenolic resin sourced carbon treated at 660° C. consists of C: 95.27%, H: 1.76%, N: 0.1%, and O: 2.11%. The phenolic resin sourced carbon treated at 660° C. was also subjected to BET analysis to probe the surface area of the carbon, which was 426.8621 $m^2/gm$.

The resulting carbon was used to cast anode electrodes for a lithium ion capacitor. The anode consisted of 90 wt % of the phenolic resin sourced carbon, 5 wt % Timcal Super C-45 conductive carbon, and 5 wt. % of KYNAR HSV 900 grade PVDF (molecular weight: 1,000,000) as a binder.

The anode was prepared as follows. 3.6 grams of the phenolic resin sourced carbon and 0.2 grams of Timcal Super C-45 were balled milled in a Retsch PM-100 ball mill for 15 mins at 350 rpm. 0.2 gram of PVDF was added to the mixture and ball-milled for 15 mins at 350 rpm. Several drops of N-methyl pyrrolidinone (NMP) were added to the mixture to form a paste of the mixture. The paste was then coated on a copper foil (Product number—Oak Mitsui TLB-DS), and passed through a rolling mill to produce a 4 mil thickness. The calendared electrodes were punched to make 14 mm diameter circular electrodes. The punched electrodes were the dried 16 hrs at 120° C. under vacuum.

The cathode consisted of 85% of the above mentioned activated Corning carbon, 10 wt % PTFE (DuPont 601A Teflon PTFE), and 5 wt % Cabot Black Pearl 2000 (see for example, U.S. Pat. Nos. 8,318,356, 8,784,764, 8,524,632, and 8,541,338).

A Li ion capacitor was built in a CR2032 format cell by stacking in an aluminum clad coin cell, in the order of:

the cathode electrode made from 85 wt % of Corning carbon, and 5% Cabot Black Pearl 2000;

an NKK-4425 separator; and 5 mg of lithium composite powder (LCP) is coated on the anode made of the phenolic resin sourced carbon (660° C.).

The lithium composite powder (LCP) is an encapsulated lithium particle comprising: a core comprised of at least one of: lithium; a lithium metal alloy; or a combination thereof; and a shell comprised of a lithium salt, and an oil, the shell encapsulates the core, and the particle has a diameter of from 1 to 500 microns (see commonly owned and assigned U.S. Ser. No. 13/673,019, filed Nov. 9, 2012, entitled "LITHIUM COMPOSITE PARTICLES," and U.S. Ser. No. 14/493,886, filed Sep. 23, 2014, entitled "ENCAPSULATED LITHIUM PARTICLES AND METHODS OF MAKING AND USE THEREOF"). The LCP is used for pre-doping the anode.

The Corning carbon was made from a wheat flour precursor. The wheat flour was carbonized at from 650 to 700° C. The carbonized carbon was ground to a particle size of approximately 5 microns. The ground carbonized carbon was then activated at 750° C. with KOH (alkali) in a weight ratio of 2.2:1 KOH:carbon for 2 hrs. The carbon was further washed with water to remove any remaining KOH. The resulting activated carbon was then treated with HCl to neutralize any trace of KOH and then washed with water to neutralize the carbon to a pH of 7. The activated carbon was then heat-treated under nitrogen and hydrogen forming gas at 900° C. for 2 hrs.

The cell was then crimped on a MTI coin cell crimper and conditioned on an Arbin BT 2000 at a constant current charge/discharge at 0.5 mA current from 3.8V to 2.2V. The phenolic resin based carbon was carbonized at 660° C. and gave a discharge capacity of 39.374 mAh/gm (based on the anode carbon weight) after the third conditioning cycle (FIG. 2). The cell was subjected to C-Rate performance where the cell was charged at a constant current of 1 mA and discharged at different rates. FIG. 3 shows the C-rate performance of the phenolic resin based carbon carbonized at 600° C.) on volume basis. The cell showed a maximum energy density of 29.44 Wh/l.

Comparative Example 2

Graphite Sourced Carbon and Electrode Performance

A Timcal TB-17 graphite powder specially synthesized for Li ion electrode applications was acquired from MTI Corp., and used as received. The received carbon was subjected to Raman spectroscopy for structure analysis. The stacked Raman spectra are shown in FIG. 1. The graphite showed an $I_D$ peak (disorder peak) at 1316.33 cm$^{-1}$ with an intensity of 3019.06 a.u., and an $I_G$ peak at approximately 1599.91 cm$^{-1}$ with an intensity of 2000.583 a.u. (Table 1). The peak ratio of $I_D/I_G$ was 1.51. The Timcal graphite powder was subjected to elemental analysis as in Comparative Example 1. found: C: 99.4%; H: 0.27%; N: 0.02%; and O: less than 0.1%.

The graphite was used in casting anode electrodes for a lithium ion capacitor. The anode consisted of 90 wt % Timcal graphite powder, 5 wt % Timcal Super C-45 conductive carbon from MTI Corp., and 5 wt % of KYNAR HSV 900 grade PVDF (molecular weight: 1,000,000) as a binder.

3.6 grams of the Timcal graphite powder carbon and 0.2 grams of the Timcal Super C-45 were balled milled in a Retsch PM-100 ball mill for 15 mins at 350 rpm. 0.2 grams of PVDF was added to the Timcal graphite powder and Timcal Super C-45 mixture and was ball-milled for 15 mins at 350 rpm. A few drops of N-methyl pyrrolidinone (NMP) were added to the mixture to form a paste of the mixture. The paste was then coated on a copper foil (Product number—Oak Mitsui TLB-DS), and passed through a rolling mill to achieve a 4 mil thickness. The calendared electrodes were punched to make 14 mm diameter circular electrodes. The punched electrodes were the dried 16 hrs at 120° C. under vacuum.

A Li ion capacitor was built in a CR2032 format cell. The cathode comprised 85% of the above mentioned Corning carbon, 10% PTFE (DuPont 601A Teflon PTFE), and 5% Cabot Black Pearl 2000. The separator was NKK-4425 separator. The 5 mg of the above mentioned lithium composite powder was coated on an anode made from the Timcal TB-17 graphite powder.

The cell was then crimped on a MTI coin cell crimper and conditioned on an Arbin BT 2000 at constant current charge/discharge at 0.5 mA current from 3.8V to 2.2V. The cell with graphite anode gave a discharge capacity of 48.46 mAh/gm (based on the anode carbon weight) after the third conditioning cycle (FIG. 2). The cell was subjected to C-Rate performance where the cell was charged at a constant current of 1 mA and discharged at different rates. FIG. 3 shows the C-rate performance of the Timcal TB-17 Graphite on a volume basis. The cell had a maximum energy density of 36.69 Wh/l.

Example 3

NPC-15 High Density Coke—Untreated

A petroleum coke based carbon (NPC-15 High Density Coke—Untreated, obtained from Asbury Carbon) was ground to a 5 micron particle size and subjected to Raman spectroscopy for structure analysis. The stacked Raman spectra are shown in FIG. 1. The coke sourced carbon had an $I_D$ peak (disorder peak) at 1330.22 cm$^{-1}$ with an intensity of 2984.201 a.u., and an $I_G$ peak at approximately 1608.98 cm$^{-1}$ with an intensity of 2029.153 a.u. (Table 1). The ratio of $I_D/I_G$ for the coke sourced carbon was 1.47. The coke sourced carbon was also subjected to elemental analysis as in Comparative Example 1. found: C: 98.72%; H: 0.06%; N: 0.19%; and O: 0.36%.

The coke sourced carbon was used in casting anode electrodes for a lithium ion capacitor. The anode consisted of 90 wt % of the above mentioned coke sourced carbon, 5 wt % Timcal Super C-45 conductive carbon, and 5 wt % of KYNAR HSV 900 grade PVDF (molecular weight: 1,000, 000) as a binder.

3.6 grams of coke sourced carbon and 0.2 grams of Timcal Super C-45 were balled milled in a Retsch PM-100 ball mill for 15 mins at 350 rpm. 0.2 grams of PVDF was added to the mixture, and ball-milled for 15 mins at 350 rpm. A few drops of N-methyl pyrrolidinone (NMP) were added to the mixture of coke sourced carbon (NPC 15), Timcal Super C-45, and PVDF, to form a paste of the mixture. The paste was then coated on a copper foil (Product number—Oak Mitsui TLB-DS), and passed through a rolling mill to achieve a 4 mil thickness. The calendared electrodes were punched to make 14 mm diameter circular electrodes. The punched electrodes were the dried 16 hrs at 120° C. under vacuum.

A Li ion capacitor was built in a CR2032 format cell. The cathode comprised 85% of the above mentioned Corning carbon, 10% PTFE (DuPont 601A Teflon PTFE), and 5% Cabot Black Pearl 2000. The separator was an NKK-4425 separator. 5 mg of the above mentioned lithium composite powder was coated on an anode made from the untreated NPC-15 High Density Coke.

The cell was then crimped on a MTI coin cell crimper and conditioned on an Arbin BT 2000 at constant current charge/discharge at 0.5 mA current from 3.8V to 2.2V. The untreated NPC-15 High Density Coke carbon had a discharge capacity of 67.09 mAh/gm (based on the anode carbon weight) after the third conditioning cycle (FIG. 2). The cell was subjected to C-Rate performance where the cell was charged at a constant current of 1 mA and discharged at different rates. FIG. 3 shows the C-rate performance of the untreated NPC-15 High Density Coke sourced carbon on a volume basis. The cell had a maximum energy density of 49.62 Wh/l.

Example 4

NPC-15 High Density Coke Heat Treated at 1400° C.

A high density coke sourced carbon (NPC-15 High Density coke) was acquired from Asbury Carbons and ground to 5 micron particle size. The ground carbon was then treated at 1400° C. for 2 hrs. The furnace was ramped at 200° C./hr rate. The carbon was then cooled to ambient temperature. The heated and cooled carbon was subjected to Raman spectroscopic structure analysis and the stacked Raman spectra is shown in FIG. 1. The carbon showed an $I_D$ peak (disorder peak) at 1314.70 cm$^{-1}$ with an intensity of 2793.14 a.u., and an $I_G$ peak at approximately 1603.22 cm$^{-1}$ with an intensity of 2000.950 a.u. (Table 1). The $I_D/I_G$ ratio was 1.40. The carbon was also subjected to percentage analysis as in Comparative Example 1. found: C: 98.76%; H: 0.05%; N: 0.18%; and O: 0.1%. The NPC-15 High Density Coke carbon treated at 1400° C. was also subjected to BET analysis to probe the surface area of the carbon, which was 8.4131 m$^2$/gm.

The coke sourced carbon was used in casting anode electrodes for a lithium ion capacitor. The anode consisted of 90 wt % of the above mentioned coke sourced carbon, 5 wt % Timcal Super C-45 conductive carbon, and 5 wt % of KYNAR HSV 900 grade PVDF (molecular weight: 1,000,000) as a binder.

3.6 grams of the coke sourced carbon and 0.2 grams of Timcal Super C-45 were balled milled in a Retsch PM-100 ball mill for 10 minutes at 350 rpm. 0.2 grams of PVDF was added to the mixture and ball-milled for 10 mins at 350 rpm. 5 mL of N-methyl pyrrolidinone (NMP) was added to the mixture to form a slurry and the slurry was then coated on a copper foil (Product number—Oak Mitsui TLB-DS) to achieve the desired 2.5 to 2.65 mil thickness. The coated electrodes were dried under vacuum at 60° C. The electrodes are punched to make 14 mm diameter circular electrodes. The punched electrodes were the dried for 16 hrs at 120° C. under vacuum.

A lithium ion capacitor was built in a CR2032 format cell by stacking in the order of: a cathode electrode made from 85% of the above mentioned Corning Carbon, 10% PTFE (DuPont 601A Teflon PTFE), and 5% Cabot Black Pearl 2000; an NKK-4425 separator; and the anode having 3.5 mg of the above mentioned lithium composite powder coated on the NPC-15 High Density Coke treated at 1400° C., in an aluminum clad coin cell. The cell was then crimped on a MTI coin cell crimper and conditioned on a Arbin BT2000 at constant current charge/discharge at 0.5 mA current from 3.8V to 2.2V. The cell including the NPC-15 High Density Coke treated at 1400° C. had a discharge capacity of 73.164 mAh/gm (based on the anode carbon weight) after the third conditioning cycle (FIG. 2). The cell was subjected to C-Rate performance where the cell was charged at a constant current of 1 mA and discharged at different rates. FIG. 3 shows the C-rate performance of the cell including the NPC-15 High Density Coke treated at 1400° C. sourced carbon on a volume basis. The cell had a maximum energy density of 37.48 Wh/l.

Example 5

NPC-15 High Density Coke Heat Treated at 1600° C.

Example 4 was repeated with the exception that the ground carbon was treated at 1600° C. for 2 hrs. The carbon had an $I_D$ peak (disorder) at 1316.51 cm$^{-1}$ having an intensity of 3447.53 a.u., and an $I_G$ peak at approximately 1605.78 cm$^{-1}$ having an intensity of 2441.87 a.u. (Table 1). The ratio of $I_D/I_G$ was 1.41. The carbon was also subjected to elemental analysis as in Comparative Example 1. found: 99.08%; H: 0.05%; N: 0.09%; and O: 0.1%.

The NPC-15 High Density Coke treated at 1600° C. carbon was also subjected to BET analysis to probe the surface area of the carbon, which was 7.3568 m$^2$/gm.

The NPC-15 High Density Coke treated at 1600° C. carbon was used in casting anode electrodes for lithium ion capacitor and tested as in Example 4. The coke based carbon gave a discharge capacity of 91.62 mAh/gm (based on the anode carbon weight) after the third conditioning cycle (FIG. 2). FIG. 3 shows the C-rate performance of the NPC-15 High Density Coke treated at 1600° C. sourced carbon on a volume basis. The cell had a maximum energy density of 53.70 Wh/l.

Example 6

Conoco Green Rodeo Coke—Untreated

Conoco Green Rodeo coke was acquired from Conoco Phillips and ground to 5 micron particle size. The resulting carbon was subjected to Raman spectroscopy for structure analysis and the stacked Raman spectra are shown in FIG. 1. The Green Rodeo coke showed fluorescence in the Raman Spectra. The carbon had an $I_D$ peak (disorder peak) at 1354.76 cm$^{-1}$ with an intensity of 61590.800 a.u., and an $I_G$ peak at approximately 1593.02 cm$^{-1}$ with an intensity of 65434.60 a.u. (Table 1). The ratio of $I_D/I_G$ was 0.94. The carbon was also subjected to elemental analysis as in Comparative Example 1. found: C: 89.62%; H: 3.92%; N: 2.65%; and O: 1.64%.

The untreated Conoco Green Rodeo Coke sourced carbon was used in casting anode electrodes for lithium ion capacitor and tested as in Example 4. The untreated Conoco Green Rodeo Coke sourced carbon gave a discharge capacity of 5.330 mAh/gm (based on the anode carbon weight) after the third conditioning cycle (FIG. 2). FIG. 3 shows the C-rate performance of the untreated Conoco Green Rodeo Coke sourced carbon on a volume basis. The cell had a maximum energy density of 0.477 Wh/l.

Example 7

Conoco Green Rodeo Coke—Treated at 1400° C.

Example 6 was repeated with the exception that the ground carbon was then treated at 1400° C. for 2 hrs. The furnace was ramped at 200° C./hr rate. The carbon was then cooled to room temperature. The carbon was subjected to Raman spectroscopy for structure analysis and the stacked Raman spectra are shown in FIG. 1. The carbon had an $I_D$ peak (disorder peak) at 1318.57 cm$^{-1}$ with an intensity of 5837.64 a.u., and an $I_G$ peak at approximately 1600.03 cm$^{-1}$ with an intensity of 4196.67 a.u. (Table 1). The peak ratio of $I_D/I_G$ was 1.39. The carbon was also subjected to elemental analysis as in Comparative Example 1. found: C: 97.72%; H: 0.13%; N: 0.69%; and O: 0.1%.

The carbon was used in casting anode electrodes for lithium ion capacitor and tested as in Example 5. The cell including the Conoco Green Rodeo Coke treated at 1400° C. carbon gave a discharge capacity of 96.840 mAh/gm (based on the anode carbon weight) after the third conditioning cycle (FIG. 2). FIG. 3 shows the C-rate performance of the cell including the Conoco Green Rodeo Coke treated at 1400° C. carbon on a volume basis. The cell had a maximum energy density of 52.059 Wh/l.

Example 8

Conoco Green Rodeo Coke—Heat Treated at 1600° C.

Example 6 was repeated with the exception that the ground carbon was then treated at 1600° C. for 2 hrs. The furnace was ramped at 200° C./hr rate. The carbon was then cooled to room temperature. The carbon was subjected to Raman spectroscopy for structure analysis and the stacked Raman spectra are shown in FIG. 1. The carbon had an $I_D$ peak (disorder peak) at 1315.19 cm$^{-1}$ with an intensity of 5832.57 a.u., and an $I_G$ peak at approximately 1599.04 cm$^{-1}$ with an intensity of 4269.24 a.u. (Table 1). The peak ratio of $I_D/I_G$ was 1.37. The carbon was also subjected to elemental analysis as in Comparative Example 1. found: C: 98.97%; H: 0.06%; N: 0.16%; and O: 0.1%. The Conoco Green Rodeo Coke treated at 1600° C. carbon was also subjected to BET analysis to probe the surface area of the carbon, which was 2.7987 m$^2$/gm.

The Conoco Green Rodeo Coke treated at 1600° C. carbon was used in casting anode electrodes for lithium ion capacitor and tested as in Example 4, and gave a discharge capacity of 89.220 mAh/gm (based on the anode carbon weight) after the third conditioning cycle (FIG. 2). FIG. 3 shows the C-rate performance of the Conoco Green Rodeo Coke treated at 1600° C. carbon on a volume basis. The cell had a maximum energy density of 48.890 Wh/l.

The disclosed coke based carbons in the above examples had superior performance compared to the phenolic resin sourced carbon and the graphite sourced carbon, as an anode in a lithium ion capacitor.

The disclosed inventive electrodes for lithium ion capacitors can comprise, for example: a coke sourced carbon material characterized by Raman analysis to have an $I_D$ to $I_G$ peak intensity ratio of from 1.25 and 1.55; and an elemental analysis having H: less than 0.25 wt %, N: greater than 0.10 wt %; and an O: less than 2 wt % for example, from above 0.1 wt % to 1.95 wt %.

TABLE 1

Comparison of Raman Intensities (I) for the Disorder ($I_D$) peak, Graphitic peak ($I_G$), and peak ratio ($I_D/I_G$) for different carbons.

| Carbon Example | $I_D$ (a.u) | $I_G$ (a.u) | $I_D/I_G$ |
|---|---|---|---|
| Comparative Ex. 1 (Phenolic Resin 660° C.) | 2339.745 | 1952.962 | 1.20 |
| Comparative Ex. 2 (Timcal Graphite) | 3019.060 | 2000.583 | 1.51 |
| Ex. 3 | 2984.201 | 2029.153 | 1.47 |
| Ex. 4 | 2793.140 | 2000.950 | 1.40 |
| Ex. 5 | 3447.530 | 2441.870 | 1.42 |
| Ex. 6 | 61590.800 | 65434.600 | 0.94 |
| Ex. 7 | 5837.640 | 4196.670 | 1.39 |
| Ex. 8 | 5832.570 | 4269.240 | 1.37 |

TABLE 2

Comparison of relative carbon, hydrogen, nitrogen, and oxygen weight percentages in different carbons.

| Example Number | Carbon % | Hydrogen % | Nitrogen % | Oxygen % |
|---|---|---|---|---|
| Comparative Ex. 1 (Phenolic Resin 660° C.) | 95.27 | 1.76 | 0.1 | 2.11 |
| Comparative Ex. 2 (Timcal-Graphite) | 99.44 | 0.27 | 0.02 | <0.1 |
| Ex. 3 (Coke sourced carbon) | 98.72 | 0.06 | 0.19 | 0.36 |
| Ex. 4 (Coke sourced carbon) | 98.76 | <0.05 | 0.18 | <0.1 |
| Ex. 5 (Coke sourced carbon) | 99.08 | <0.05 | 0.09 | <0.1 |
| Ex. 6 (Coke sourced carbon) | 89.62 | 3.92 | 2.65 | 1.64 |
| Ex. 7 (Coke sourced carbon) | 97.72 | 0.13 | 0.69 | <0.1 |
| Ex. 8 (Coke sourced carbon) | 98.97 | 0.06 | 0.16 | <0.1 |

The disclosure has been described with reference to various specific embodiments and techniques. However, it should be understood that many variations and modifications are possible while remaining within the scope of the disclosure.

What is claimed is:

1. A lithium ion capacitor, comprising:
   a cell comprising a stack of:
   an anode comprising: a carbon composition comprising: a coke sourced carbon in from 85 to 95 wt %; a conductive carbon in from 1 to 8 wt %; and a binder in from 3 to 10 wt %, based on the total weight of the carbon composition; and an electrically conductive substrate that supports the carbon composition,
   wherein the coke sourced carbon has a disorder (D) peak to graphitic (G) peak intensity ratio by Raman analysis of from 1.25 to 1.55; a hydrogen content of from 0.01 to 0.25 wt %; a nitrogen content of from 0.03 to 0.75 wt %; and an oxygen content of from 0.05 to 2.0 wt % by elemental analysis;
   a cathode comprising a heat and KOH activated wheat flour sourced carbon, a fluoropolymer, and a conductive carbon black;
   a separator between the anode and cathode; and
   a lithium composite powder coated on at least a portion of the surface of the anode.

2. The lithium ion capacitor of claim 1 wherein the anode operates at a high charge-discharge rate of from 1 C to 4000 C.

3. The lithium ion capacitor of claim 1 wherein the cell has a discharge capacity of from 60 to 120 mAh/gm and a maximum energy density of from 30 to 60 Wh/l.

4. The lithium ion capacitor of claim 1 wherein:
   the coke sourced carbon in from 88 to 92 wt %;
   the conductive carbon in from 4 to 7 wt %; and
   the binder is PVDF in from 4 to 6 wt % and has a molecular weight of from 300,000 to 1,000,000.

5. The lithium ion capacitor of claim 1 wherein the coke sourced carbon has a disorder (D) peak to graphitic (G) peak intensity ratio by Raman analysis of from 1.35 to 1.48.

6. The lithium ion capacitor of claim 1 wherein the coke sourced carbon has a hydrogen content of from 0.01 to 0.24 wt %; a nitrogen content of from 0.08 to 0.7 wt %; and an oxygen content of from 0.01 to 1.9 wt %.

7. The lithium ion capacitor of claim 1 wherein the coke sourced carbon has a low surface area of from 1 to 100 m$^2$/g.

8. The lithium ion capacitor of claim 1 wherein the coke sourced carbon has a particle size from 1 to 30 microns.

9. The lithium ion capacitor of claim 1 wherein the coke sourced carbon has a particle size from 2 to 7 microns.

* * * * *